United States Patent
Le Loarer et al.

(10) Patent No.: US 7,125,538 B2
(45) Date of Patent: *Oct. 24, 2006

(54) ALUMINA AND METHODS FOR PREPARING THE SAME

(75) Inventors: Jean-Luc Le Loarer, Salindres (FR); Christophe Nedez, Salindres (FR)

(73) Assignee: Axens, Rueil-Malmaison (FR)

( * ) Notice: Subject to any disclaimer, the term of this patent is extended or adjusted under 35 U.S.C. 154(b) by 289 days.

This patent is subject to a terminal disclaimer.

(21) Appl. No.: 10/473,931

(22) PCT Filed: Mar. 28, 2002

(86) PCT No.: PCT/FR02/01096

§ 371 (c)(1), (2), (4) Date: Mar. 15, 2004

(87) PCT Pub. No.: WO02/083563

PCT Pub. Date: Oct. 24, 2002

(65) Prior Publication Data

US 2004/0146456 A1 Jul. 29, 2004

(30) Foreign Application Priority Data

Apr. 10, 2001 (FR) .................................. 01 04897

(51) Int. Cl.
- *B01J 20/08* (2006.01)
- *B01J 21/04* (2006.01)
- *B01J 32/00* (2006.01)
- *C01F 7/02* (2006.01)

(52) U.S. Cl. ............. 423/625; 423/628; 502/355; 502/415; 502/439; 502/527.11; 502/527.19; 502/527.24

(58) Field of Classification Search ................ 423/625, 423/628; 502/355, 415, 439, 527.11, 527.19, 502/527.24

See application file for complete search history.

(56) References Cited

U.S. PATENT DOCUMENTS

| | | |
|---|---|---|
| 5,055,019 A | 10/1991 | Meyer et al. |
| 5,055,443 A | 10/1991 | Mercier et al. |
| 5,266,300 A | 11/1993 | Harrison |
| 5,635,291 A | 6/1997 | Yoshino et al. |
| 6,048,470 A | 4/2000 | Nakahara et al. |
| 2002/0027304 A1* | 3/2002 | Robson et al. ................. 264/12 |
| 2002/0043734 A1* | 4/2002 | Ohji et al. ..................... 264/43 |
| 2003/0017945 A1* | 1/2003 | Kolenda et al. ............. 502/355 |
| 2003/0052047 A1* | 3/2003 | Pinnavaia et al. .......... 208/297 |

FOREIGN PATENT DOCUMENTS

| | | |
|---|---|---|
| DE | 198 36 821 A1 | 2/2000 |
| DE | 198 43 241 A1 | 3/2000 |
| EP | 0 656 413 A1 * | 6/1995 |
| FR | 2 764 208 | 12/1998 |

OTHER PUBLICATIONS

International Search Report—PCT/FR02/01096.

* cited by examiner

*Primary Examiner*—Timothy C. Vanoy
(74) *Attorney, Agent, or Firm*—Welsh & Katz

(57) ABSTRACT

The invention provides alumina agglomerates of the type obtained by dehydrating an aluminum hydroxide or oxyhydroxide, agglomerating the alumina obtained, hydrothermally treating the agglomerates and calcining. The invention also provides a catalyst support, an adsorbent material and a catalyst constituted by said agglomerates. The invention also provides methods for preparing said agglomerates.

20 Claims, 2 Drawing Sheets

ALUMINA AND METHODS FOR PREPARING THE SAME

The invention relates to the field of alumina agglomerates, especially for use as adsorbents, as catalyst supports, or as catalysts. More precisely, it relates to novel alumina agglomerates with specific physical characteristics, in particular as regards their porosity, endowing them with particularly advantageous properties. It also relates to a method for producing said agglomerates.

Said agglomerates can be used in the oil or petrochemicals industry in particular. After eliminating metals contained in oil, the sulfur content in the oil is normally then reduced by passage over a catalyst deposited on a support. The efficiency of the operation depends on a number of factors. One factor is the porosity of the support, which dictates the surface area of the catalyst offered to the oil to be desulfurized. While high porosity is often desirable, it does not necessarily have to be as high as possible. It is also important for the catalyst and its support to be compatible, and for the support to have sufficient mechanical strength to provide sound service over time under service conditions. Such properties may tend to degrade more severely with the highest porosities. Further, it is important to find the best compromise between the properties of the material and its cost.

Similarly, the adsorbent properties of aluminas are not unequivocally linked to the overall porosity of the material: a maximum number of small sized pores is not necessarily a gauge of the efficiency of the material.

The aim of the invention is to provide alumina agglomerates with good efficiency as adsorbents, catalyst supports, or intrinsic catalysts for materials.

To this end, the invention provides alumina agglomerates of the type obtained by dehydrating an aluminum hydroxide or oxyhydroxide, agglomerating the alumina obtained, hydrothermally treating the agglomerates and calcining, characterized in that:

they have a specific surface area in the range 90 square meters per gram ($m^2/g$) to 220 $m^2/g$, preferably in the range 100 $m^2/g$ to 200 $m^2/g$;

they have a $V_{37\,Å}$ in the range 40 milliliters per hundred grams (ml/100 g) to 65 ml/100 g, preferably in the range 45 ml/100 g to 60 ml/100 g;

they have a $V_{200\,Å}$ of 12 ml/100 g or more, preferably 15 ml/100 g or more, more preferably 18 ml/100 g or more; and they have a specific surface area/$V_{200\,Å}$ ratio of 10 or less, preferably 8.5 or less, more preferably 7 or less.

They may have a $V_{100\,Å}/V_{200\,Å}$ ratio of 2.6 or less, preferably 2.3 or less, more preferably 2 or less.

They may have a median pore diameter of 12 nanometers (nm) or more, preferably 14 nm or more, and a median pore diameter (in nm)/$V_{200\,Å}$ (in ml/100 g) ratio of 1.1 or less, preferably 1.0 or less, more preferably 0.9 or less.

They may have a $V_{1\,\mu m}$ of 10 ml/100 g or less, preferably 8.5 ml/100 g or less, more preferably 7 ml/100 g or less.

They may have a $V_{0.1\,\mu m}$ of 8 ml/100 g or more, preferably 10 ml/100 g or more.

In a particular embodiment, they have a specific surface area in the range 90 to 220 $m^2/g$, a $V_{37\,Å}$ in the range 45 to 60 ml/100 g, a $V_{200\,Å}$ of 18 ml/100 g or more, a specific surface area/$V_{200\,Å}$ ratio of 8.5 or less, a $V_{100\,Å}/V_{200\,Å}$ ratio of 2 or less, a median pore diameter of 12 nm or more, a median pore diameter/$V_{200\,Å}$ ratio of 0.9 or less, and a $V_{1\,\mu m}$ of 7 ml/100 g or less.

These agglomerates are preferably obtained from hydrargillite.

They are preferably in the form of beads, but can also be in the form of extruded materials, crushed materials or monoliths.

The invention also provides a catalyst support, in particular for the oil or petrochemicals industry, characterized in that it is constituted by alumina agglomerates of the type defined above.

The invention also provides an adsorbent material in particular for the oil or petrochemicals industry, characterized in that it is constituted by alumina agglomerates of the type defined above.

The invention also provides a catalyst, in particular for the petrochemicals industry, characterized in that it is constituted by alumina agglomerates of the type defined above.

The invention also provides a method for preparing alumina agglomerates of the type defined above, in which:

an aluminum hydroxide or oxyhydroxide is rapidly dehydrated by flashing to obtain an alumina powder;

said alumina powder is granulated, brought into contact with a water spray and optionally supplemented with pore-forming agents, in a bowl granulator or rotary drum, optionally followed by sieving, to obtain beads with a diameter in the range 0.8 millimeters (mm) to 10 mm, preferably in the range 1 mm to 5 mm;

said beads are calcined to provide them with a compact packing density of 300 $kg/m^3$ to 1200 $kg/m^3$, preferably 600 $kg/m^3$ to 1100 $kg/m^3$, and a specific surface area of 60 $m^2/g$, preferably in the range 80 $m^2/g$ to 420 $m^2/g$;

said beads are treated hydrothermally by impregnating with water or with an aqueous solution of an acid or a mixture of mineral or organic acids, then treating in an autoclave at a temperature of more than 80° C.;

and said beads are calcined to endow then with a specific surface area of 90 $m^2/g$ to 220 $m^2/g$.

The invention also provides a method for preparing alumina agglomerates of the type defined above, in which:

a material or a mixture of materials based on alumina, optionally supplemented with pore-forming agents, is mixed then extruded;

the extruded materials are calcined;

said extruded materials are treated hydrothermally by impregnating with water or an aqueous solution of an acid or a mixture of mineral or organic acids, then treating in an autoclave at a temperature of more than 80° C.;

and said extruded materials are calcined to endow them with a specific surface area of 90 $m^2/g$ to 220 $m^2/g$.

Said aqueous impregnating solution used during the hydrothermal treatment can be supplemented with one or more compounds that can liberate anions that are capable of combining with the aluminum ions.

Said hydrothermal treatment can be carried out at a temperature in the range 80° C. to 250° C., preferably in the range 150° C. to 250° C., for a period in the range 20 minutes (min) to 36 hours (h), preferably in the range 40 min to 12 h.

The calcining treatment following the hydrothermal treatment can be carried out at a temperature of 400° C. to 1300° C., preferably 500° C. to 1300° C., for a period of less than 6 h.

The aluminum hydroxide or the alumina-based material is preferably hydrargillite.

As shown below, the invention consists in endowing alumina agglomerates with precise porosity characteristics with a distribution of pores with different diameters satisfying strict criteria. This provides a good compromise between occasionally contradictory demands, namely:

- a porosity providing a large specific surface area, thereby offering good possibilities for reaction with the medium with which the agglomerates comes into contact;
- a porosity that is not too high, however, in particular so that it does not severely compromise the mechanical strength of the agglomerates during use when such strength is required; the material obtained will often be a good performance/cost compromise;
- pores with a mean size that is not too fine, to ensure good penetration of the medium with which the agglomerate comes into contact, and thus good exploitation of the available reactive surface.

BRIEF DESCRIPTION OF THE DRAWINGS

The invention will be better understood on reading the following description made with reference to the accompanying drawings in which.

The remainder of the description refers to different parameters which are defined as follows.

The morphology of the agglomerates is defined by indicating the volumes occupied by pores with a diameter that is greater than or equal to a given series of diameters, namely:

- the volume occupied by pores with a diameter of 37 Å or more ($V_{37 Å}$);
- the volume occupied by pores with a diameter of 100 Å or more ($V_{100 Å}$);
- the volume occupied by pores with a diameter of 200 Å or more ($V_{200 Å}$);
- the volume occupied by pores with a diameter of 0.1 μm or more ($V_{0.1 \mu m}$);
- the volume occupied by pores with a diameter of 1 μm or more ($V_{1 \mu m}$).

Said volumes can be measured in a conventional manner using the mercury porosimeter technique.

To this end, the alumina sample is placed in a column into which mercury is introduced at a pressure P. The mercury does not wet the alumina, and so its penetration or otherwise into pores with a given diameter in a sample is a function of the value of P. Finer pores require a higher pressure P to fill them than coarser pores. Measuring the quantity of mercury penetrating into the sample at different values of P allows the volume occupied by pores with a diameter that is higher than the values given for that diameter to be determined.

Figure 1:
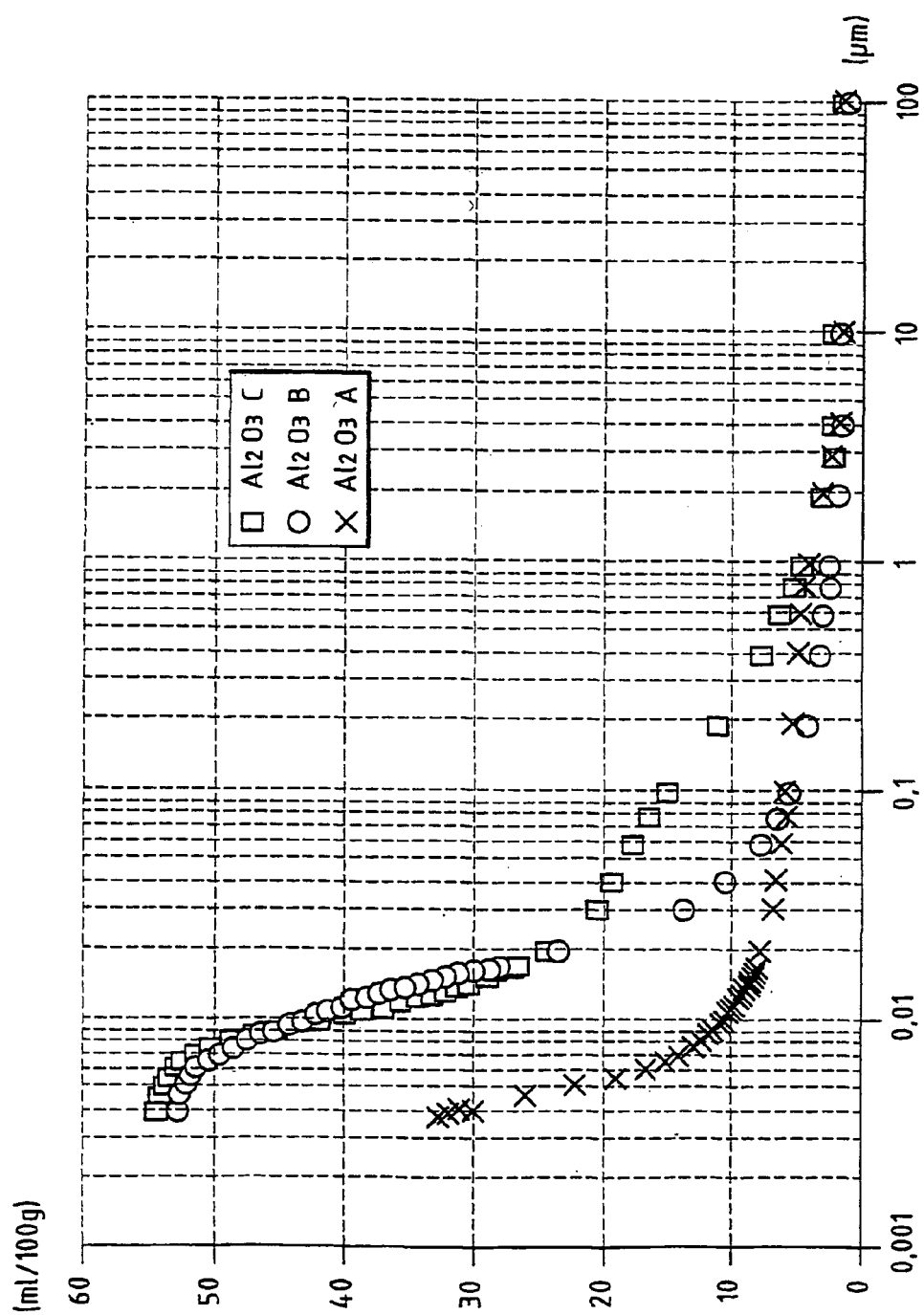
FIG. 1 represents the pore distribution of an alumina A obtained as an intermediate product in one example of an implementation of the method of the invention, and the pore distribution of two final aluminas B and C in accordance with the invention, obtained from this alumina A; the pore diameter (in μm) is given along the abscissa and the cumulative pore volume (in ml/100 g) is given up the ordinate.

Thus, a curve defining the pore distribution of the material can be produced, as shown in FIG. 1. From this curve, it is also possible to calculate the median diameter ($d_{median}$) for the pores, namely the diameter of the pores on the curve corresponding to half the cumulative pore volume estimated by $V_{37 Å}$.

The morphology of the agglomerates is also characterized, as is conventional, by indicating their specific surface area. The ratio between this specific surface area and $V_{200 Å}$ and the ratios $V_{100 Å}/V_{200 Å}$ and $d_{median}/V_{200 Å}$ are also taken into account.

Two non-limiting examples of producing alumina agglomerates in accordance with the invention will now be described.

Firstly, as in known prior methods, rapid and intense heating known as flashing is carried out, resulting in severe dehydration of an aluminum hydroxide (hydrargillite, gibbsite or bayerite) or of an aluminum oxyhydroxide (boehmite or diaspore), using a stream of hot gas that can very rapidly eliminate and entrain the evaporated water. The temperature is of the order of 400° C. to 1200° C., and the contact time of the material to be dehydrated with the gas is of the order of a fraction of a second to 4 or 5 seconds. Alumina is then obtained in the form of a powder. A preferred starting compound is hydrargillite. Experience has shown that this compound is the best for producing a final product with the desired properties. Further, it is relatively inexpensive.

This alumina is then formed into beads by bringing it into contact with a spray based on water in a bowl granulator (a bowl rotating about an inclined axis). Additives such as materials known as "pore-forming agents" can be added simultaneously or successively. Pore-forming agents are materials that disappear during subsequent heat treatments, leaving pores in the alumina. To this end, it is possible to use wood flour, wood charcoal, sulfur, tars, plastics materials, etc. The operating parameters of the bowl granulator are adjusted so that the beads are expelled from it under centrifugal force when they reach a diameter that is generally in the range 0.8 mm to 10 mm, preferably in the range 1 mm to 5 mm. If needed, the expelled beads can be sieved to obtain a narrower range of diameters. Instead of a bowl granulator, it is possible to use a rotary drum. After maturing and calcining said beads, an alumina A is obtained that is conventionally termed "activated alumina" which, in this example, has a compact packing density of 825 kilograms per cubic meter ($kg/m^3$) and a specific surface area of 342 $m^2/g$. Normally, the compact packing density will be in the range 300 $kg/m^3$ to 1200 $kg/m^3$, preferably in the range 600 $kg/m^3$ to 1100 $kg/m^3$. The specific surface area will be more than 60 $m^2/g$, preferably in the range 80 $m^2/g$ to 420 $m^2/g$. It has the pore distribution shown in FIG. 1.

A treatment known as "hydrothermal treatment" is then carried out on alumina A. This type of treatment, known generally per se, consists of impregnating alumina agglomerates with water or an aqueous solution of an acid or a mixture of mineral or organic acids, which can also comprise compounds that can liberate anions that are capable of combining with the aluminum ions, then heating the agglomerates in an autoclave to a temperature of more than 80° C. Examples that can be cited as a product that can be added for the hydrothermal treatment are nitric acid, hydrochloric acid, perchloric acid, sulfuric acid, weak acids with a pH of less than 4 in solution such as acetic acid or formic acid, and also compounds comprising a nitrate ion (such as aluminum nitrate), a chloride ion, sulphate ion, perchlorate ion, chloroacetate ion, trichloroacetate ion, bromoacetate ion, dibromoacetate ion, and anions with general formula R—COO$^-$ such as formates and acetates. European patent EP-A-0 387 109 discloses a non-limiting example for carrying out such a treatment. A final heat treatment then endows the agglomerates with their definitive specific surface area. This calcining heat treatment is carried out at high temperature, of the order of 500° C., for example.

In a first example of said hydrothermal treatment, it is carried out at a temperature of 200° C. for 6 h 30 min, in a rotating pan autoclave and the impregnating solution is an aqueous solution containing 2.2% of aluminum nitrate and 12% of formic acid, these percentages being calculated by weight with respect to the weight of alumina introduced. The final heat treatment consists of heating the agglomerates to 500° C. for 2 h, and produces a specific surface area of 153 m²/g. An alumina B is then obtained, with a pore distribution that is shown in FIG. 1.

In a second example of hydrothermal treatment, alumina A is treated at a temperature of 220° C. for 6 h 15 min in a rotating pan autoclave and the impregnating solution is an aqueous solution containing 6% of aluminum nitrate and 0.2% of oxalic acid with respect to the weight of alumina introduced. The final heat treatment is carried out at 500° C. for 2 h, and produces agglomerates with a specific surface area of 156 m²/g. An alumina C is obtained with the pore distribution shown in FIG. 1.

Said hydrothermal treatment can be carried out at a temperature in the range 80° C. to 250° C., preferably in the range 150° C. to 250° C., for a period that is normally in the range 20 min to 36 h, preferably in the range 40 min to 12 h.

Table 1 shows the characteristics of a number of examples of alumina agglomerates obtained by the above method in the form of beads. Aluminas B and C are included as well as aluminas D to I in accordance with the invention, obtained by varying the conditions for forming and for hydrothermal treatment. In all cases, they have a grain size in the range 1.4 mm to 2.8 mm, so that the influence of grain size on performance can be ignored when comparing performances. Table 1 also shows the characteristics of starting alumina A, and two known reference aluminas J and K, which are not in accordance with the invention, which were obtained by calcining alumina A, thus with no hydrothermal treatment. Those aluminas A, J and K also have the grain size noted above.

In Table 1, the specific surface areas are shown in m²/g, the volumes in ml/100 g and the median pore diameters in nm.

the aluminas of the invention have a specific surface area/$V_{200\ Å}$ ratio that is lower than that of the reference aluminas (obligatory characteristic of the invention) and a $V_{100\ Å}/V_{200\ Å}$ ratio that is lower than that of the reference aluminas (preferred characteristic of the invention); in Examples B–I, those two parameters are lower, at respectively 7 and 2;

the aluminas of the invention have a median pore diameter that is relatively high (more than 12 nm in Examples B–I) but which can be of the same order of magnitude as that of reference alumina K; in contrast, the ratio $d_{median}$ (in nm)/$V_{200\ Å}$ (in ml/100 g) for the aluminas of the invention is substantially lower than that of the reference aluminas (less than 0.9 in Examples B–I); this characteristic is only a preferred characteristic of the invention, however;

the aluminas of the invention have values for $V_{0.1\ \mu m}$ and $V_{1\ \mu m}$ that are not necessarily distinguished from those of the reference aluminas; however, Examples B–I have a $V_{1\ \mu m}$ that is lower than the preferred upper limit of 7 ml/100 g.

Table 1 and FIG. 1 also show that aluminas B and C of the invention are distinguished from each other in that in alumina C, pores with a diameter of more than 200 Å (and in particular between 200 Å and 1 μm) represent a substantially larger volume than in alumina B. Compared with starting alumina A, the hydrothermal treatment and the final heat treatment lead for aluminas B and C to a substantial increase in the volume represented by pores with a diameter of less than 500 Å, and also to a reduction in the specific surface area of the material.

The porosity profiles demanded by the invention are particularly suited to using the alumina agglomerates as a catalyst support or as an adsorbent in particular in the oil or petrochemicals industry.

Figure 2:
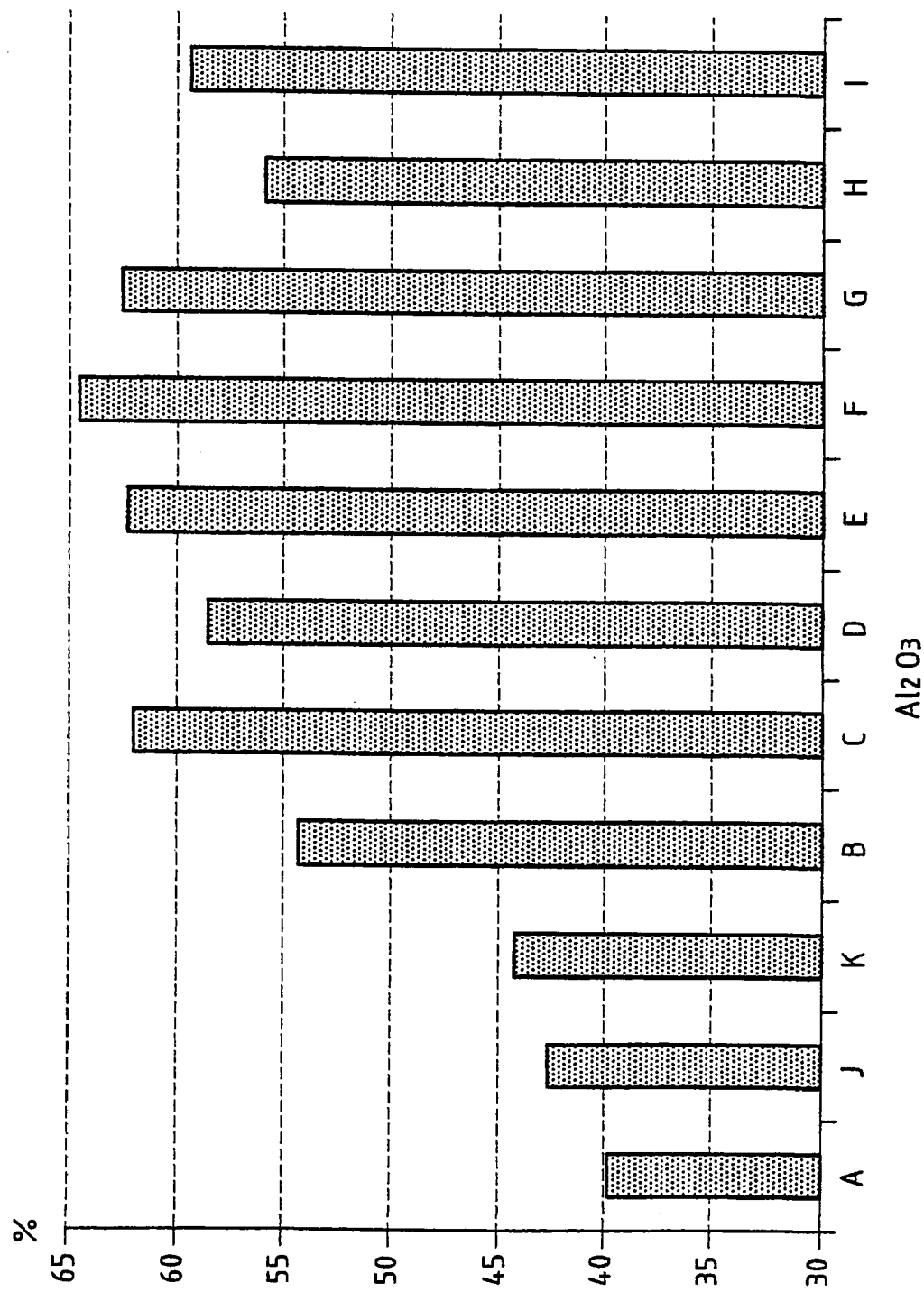
FIG. 2 shows the degrees of adsorption (as a %) of a solution of vanadium acetylacetonate in toluene by different alumina agglomerates of the invention and of the prior art.

In support of this latter statement, FIG. 2 compares the adsorbent properties of aluminas A to K of Table 1. Said aluminas were all pre-treated at 300° C. for 2 h in a stream of dry nitrogen to eliminate all traces of moisture entrained

TABLE 1

Characteristics of aluminas described

| | alumina | specific surface area | $V_{37Å}$ | $V_{200Å}$ | specific surface area/$V_{200Å}$ | $V_{100Å}/V_{200Å}$ | $d_{median}$ | $d_{median}/V_{200Å}$ | $V_{0.1\mu m}$ | $V_{1\mu m}$ |
|---|---|---|---|---|---|---|---|---|---|---|
| start | A | 342 | 32.7 | 7.5 | 45.6 | 1.36 | 6.0 | 0.80 | 5.6 | 4.0 |
| ref | J | 168 | 48.2 | 9.3 | 18.1 | 2.83 | 10.4 | 1.12 | 6.1 | 4.2 |
| | K | 126 | 50.8 | 12.4 | 10.2 | 3.19 | 14.2 | 1.15 | 6.7 | 4.5 |
| invention | B | 153 | 53.0 | 23.2 | 6.6 | 1.86 | 18.3 | 0.79 | 5.4 | 2.4 |
| | C | 156 | 54.7 | 24.1 | 6.5 | 1.73 | 17.0 | 0.71 | 15.0 | 4.5 |
| | D | 120 | 56.9 | 27.4 | 4.4 | 1.84 | 19.6 | 0.72 | 5.1 | 2.1 |
| | E | 101 | 58.3 | 32.7 | 3.1 | 1.68 | 21.7 | 0.66 | 5.7 | 2.6 |
| | F | 122 | 58.9 | 27.1 | 4.5 | 1.86 | 17.7 | 0.65 | 15.7 | 5.5 |
| | G | 96 | 58.7 | 29.5 | 3.3 | 1.87 | 20.1 | 0.68 | 16.8 | 5.5 |
| | H | 168 | 52.9 | 25.4 | 6.6 | 1.59 | 16.2 | 0.64 | 5.8 | 2.1 |
| | I | 163 | 52.6 | 20.4 | 8.0 | 1.86 | 13.7 | 0.67 | 11.7 | 2.7 |

As shown in Table 1, the aluminas of the invention have particular characteristics relating to specific surface area and to the porosity profile. It can be seen that, compared with the prior art reference aluminas:

the aluminas of the invention in examples B–I have a high $V_{200\ Å}$ which is higher than the more preferred minimum limit of 18 ml/100 g demanded by the invention;

during storage. Then, without returning them to ambient atmospheric conditions, they were introduced in an amount of 500 mg into different beakers containing vanadium acetylacetonate (VO(acac)₂) present in 200 ml of toluene in a concentration of 700 ppm (by weight with respect to the volume of toluene). After stirring, at ambient temperature for 60 h, the degree of adsorption of the organometallic vanadium complex by each alumina was measured by the change in the concentration of the solution determined by UV-visible spectroscopy. The results are shown in FIG. 2.

It can be seen that the degree of adsorption of the vanadium acetylacetonate by references aluminas J and K (43% and 44%) are not much higher than that obtained with alumina A which acted as an intermediate product in preparing the other aluminas (40%).

In contrast, alumina B of the invention produced a degree of adsorption of 54% and alumina C produced 62%. In general, aluminas B to I of the invention had degrees of adsorption of the order of 54% to 66%, i.e., about 10% to 21% higher than the degrees of adsorption obtained with reference aluminas J and K.

In accordance with the invention, the $V_{37\text{ Å}}$ of the alumina agglomerates must be in the range 40 ml/100 g to 65 ml/100 g. Below 40 ml/100 g, the agglomerate performance is insufficient. Above 65 ml/100 g, the strength is no longer sufficient for the preferred envisaged applications. Preferably, the $V_{37\text{ Å}}$ is in the range 45 ml/100 g to 60 ml/100 g, which is the case for aluminas B–I in Table 1.

Comparing aluminas J and K with B demonstrates the essential influence of $V_{200\text{ Å}}$, in particular the specific surface area/$V_{200\text{ Å}}$ ratio on the adsorbent properties of the material.

The methods for preparing and conditioning the alumina agglomerates of the invention have been described in detail for the preparation of beads, which constitute the preferred form of the invention. However, it should be understood that for various applications, said alumina agglomerates can be used in the form of powder, or extruded materials, or crushed materials or monoliths. In particular, in an advantageous alternative implementation, the forming step may consist of, in succession, mixing then extruding a material based on alumina or a mixture of such materials, optionally mixed with additives such as pore-forming agents. The extruded materials are then calcined then undergo hydrothermal treatment and calcining as described in the above procedure.

The invention claimed is:

1. Alumina agglomerates of the type obtained by dehydrating an aluminum hydroxide or oxyhydroxide, agglomerating the alumina obtained, hydrothermally treating the agglomerates and calcining, wherein:
    they have a specific surface area in the range 90 m$^2$/g to 220 m$^2$/g;
    they have a $V_{37\text{ Å}}$ in the range 40 ml/100 g to 65 ml/100 g;
    they have a $V_{200\text{ Å}}$ of 12 ml/100 g or more; and
    they have a specific surface area/$V_{200\text{ Å}}$ ratio of 10 or less.

2. Alumina agglomerates according to claim 1, wherein they have a $V_{100\text{ Å}}/V_{200\text{ Å}}$ ratio of 2.6 or less.

3. Alumina agglomerates according to claim 1 wherein they have a median pore diameter of 12 nm or more, and a median pore diameter (in nm)/$V_{200\text{ Å}}$ (in ml/100 g) ratio of 1.1 or less.

4. Alumina agglomerates according to claim 1 wherein they have a $V_{1\text{ }\mu m}$ of 10 ml/100 g or less.

5. Alumina agglomerates according to claim 1 wherein they have a $V_{0.1\text{ }\mu m}$ of 8 ml/100 g or more.

6. Alumina agglomerates according to claim 1 wherein they have a specific surface area in the range 90 m$^2$/g to 220 m$^2$/g, a $V_{37\text{ Å}}$ in the range 45 ml/100 g to 60 ml/100 g, a $V_{200\text{ Å}}$ of 18 ml/100 g or more, a specific surface area/$V_{200\text{ Å}}$ ratio of 8.5 or less, a $V_{100\text{ Å}}/V_{200\text{ Å}}$ ratio of 2 or less, a median pore diameter of 12 nm or more, a median pore diameter/$V_{200\text{ Å}}$ ratio of 0.9 or less, and a $V_{1\text{ }\mu m}$ of 7 ml/100 g or less.

7. Alumina agglomerates according to claim 1 wherein they are obtained from hydrargillite.

8. Alumina agglomerates according to claim 1 wherein they are in the form of beads.

9. Alumina agglomerates according to claim 1 wherein they are in the form of extruded materials.

10. Alumina agglomerates according to claim 1 wherein they are in the form of crushed materials.

11. Alumina agglomerates according to claim 1 wherein they are in the form of monoliths.

12. A catalyst support, in particular for the oil or petrochemicals industry, wherein it is constituted by alumina agglomerates—as defined in claim 1.

13. An adsorbent material, in particular for the oil or petrochemicals industry, wherein it is constituted by alumina agglomerates as defined in claim 1.

14. A catalyst, in particular for the oil or petrochemicals industry, wherein it is constituted by alumina agglomerates as defined in claim 1.

15. A method for preparing alumina agglomerates according to claim 8, in which:
    an aluminum hydroxide or oxyhydroxide is rapidly dehydrated by flashing to obtain an alumina powder;
    said alumina powder is granulated, brought into contact with a water spray and optionally supplemented with pore-forming agents, in a bowl granulator or rotary drum, optionally followed by sieving, to obtain beads with a diameter in the range 0.8 mm to 10 mm;
    said beads are calcined to provide them with a compact packing density of 300 kg/m$^3$ to 1200 kg/m$^3$, and a specific surface area of 60 m$^2$/g;
    said beads are treated hydrothermally by impregnating with water or an aqueous solution of an acid or a mixture of mineral or organic acids, then treating in an autoclave at a temperature of more than 80° C.;
    and said beads are calcined to endow then with a specific surface area of 90 m$^2$/g to 220 m$^2$/g.

16. A method according to claim 15 wherein said aqueous impregnating solution used during the hydrothermal treatment is supplemented with one or more compounds that can liberate anions that are capable of combining with the aluminum ions.

17. A method according to claim 15 wherein said hydrothermal treatment is carried out at a temperature in the range 80° C. to 250° C., for a period in the range 20 min to 36 h.

18. A method according to claim 15 wherein the calcining step following the hydrothermal treatment is carried out at a temperature of 400° C. to 1300° C., for a period of less than 6 h.

19. A method according to claim 15 wherein the aluminum hydroxide or the material based on alumina is hydrargillite.

20. A method for preparing alumina agglomerates according to claim 9, in which:
    a material or a mixture of materials based on alumina, optionally supplemented with pore-forming agents, is mixed then extruded;
    said extruded materials are calcined;
    said extruded materials are treated hydrothermally by impregnating with water or an aqueous solution of an acid or a mixture of mineral or organic acids, then treating in an autoclave at a temperature of more than 80° C.;
    and said extruded materials are calcined to endow them with a specific surface area of 90 m$^2$/g to 220 m$^2$/g.

* * * * *